United States Patent
Hubner et al.

(10) Patent No.: US 9,253,523 B2
(45) Date of Patent: Feb. 2, 2016

(54) METHODS AND SYSTEMS FOR RECOVERING MEDIA CONTENT LOST DUE TO A CHANNEL CHANGE EVENT

(71) Applicant: Verizon Patent and Licensing Inc., Arlington, VA (US)

(72) Inventors: Paul V. Hubner, McKinney, TX (US); Kristopher Pate, Flower Mound, TX (US); Steven T. Archer, Dallas, TX (US); Robert A. Clavenna, II, Lucas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 108 days.

(21) Appl. No.: 13/956,295

(22) Filed: Jul. 31, 2013

(65) Prior Publication Data
US 2015/0037011 A1 Feb. 5, 2015

(51) Int. Cl.
H04N 5/76 (2006.01)
H04N 21/4147 (2011.01)
H04N 21/438 (2011.01)
H04N 21/44 (2011.01)
G11B 20/10 (2006.01)

(52) U.S. Cl.
CPC ............. *H04N 21/4147* (2013.01); *H04N 5/76* (2013.01); *H04N 21/4384* (2013.01); *H04N 21/44004* (2013.01); *G11B 20/10527* (2013.01)

(58) Field of Classification Search
CPC .................................................. H04N 21/4263
USPC ......................................................... 386/235
See application file for complete search history.

(56) References Cited

U.S. PATENT DOCUMENTS

| | | | |
|---|---|---|---|
| 2003/0128302 A1* | 7/2003 | Potrebic et al. | 348/731 |
| 2007/0245024 A1* | 10/2007 | Prus et al. | 709/226 |
| 2008/0025694 A1* | 1/2008 | Kang | 386/83 |

* cited by examiner

*Primary Examiner* — Hung Dang
*Assistant Examiner* — Girumsew Wendmagegn

(57) ABSTRACT

An exemplary method includes a media content recovery system 1) detecting that a DVR device is tuned to a first channel used by a media content provider to distribute a first media content program, 2) dynamically storing, in response to the detecting, first program data representative of the first media content program in a local buffer residing on the DVR device and in a recovery buffer as the first media content program is distributed by the media content provider, and 3) directing the DVR device to use the first program data stored in the local buffer to present the first media content program by way of a display while the DVR device is tuned to the first channel. Corresponding methods and systems are also disclosed.

20 Claims, 15 Drawing Sheets

600

| Ch. # | Buffer Start Time | Buffer End Time | Playout Pointer Position |
|---|---|---|---|
| 5 | 10:24:12 | 11:12:42 | 10:48:01 |
| 13 | 11:12:42 | 11:29:34 | 11:13:22 |
| 17 | 12:21:12 | 12:42:11 | 12:23:43 |

Fig. 6

METHODS AND SYSTEMS FOR RECOVERING MEDIA CONTENT LOST DUE TO A CHANNEL CHANGE EVENT

BACKGROUND INFORMATION

Digital video recording ("DVR") devices allow users to flexibly view or otherwise experience media content received by the DVR devices. For example, a user may direct a DVR device to tune to a particular channel carrying a media content program. In response, the DVR device may tune to the channel, buffer the media content program in a local buffer, and begin presenting the buffered media content program after a short delay. This allows the user to pause, rewind, and/or otherwise interact with the media content program as it is being presented. If the user changes the channel, the local buffer is cleared in anticipation of the new programming. However, an inadvertent or undesirable channel change produces the same buffer-clearing result, which can be frustrating for the user.

For example, a user may be using a conventional DVR device in his living room to watch a live broadcast of a football game being presented by way of a particular channel. The user may pause the presentation of the football game so that he can go to his kitchen to make a snack. While the user is in the kitchen, the user's toddler child may get ahold of a remote control for the conventional DVR device and inadvertently change the channel. Upon returning to the living room, the user may quickly change back to the channel presenting the football game only to find that a touchdown was scored during the time that he was in the kitchen. Unfortunately, the conventional DVR device would have cleared the local buffer being used to buffer the football game in response to the child changing the channel, thus preventing the user from viewing the touchdown scoring play.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 6 shows exemplary presentation metadata according to principles described herein.

DETAILED DESCRIPTION OF PREFERRED EMBODIMENTS

Figure 1:
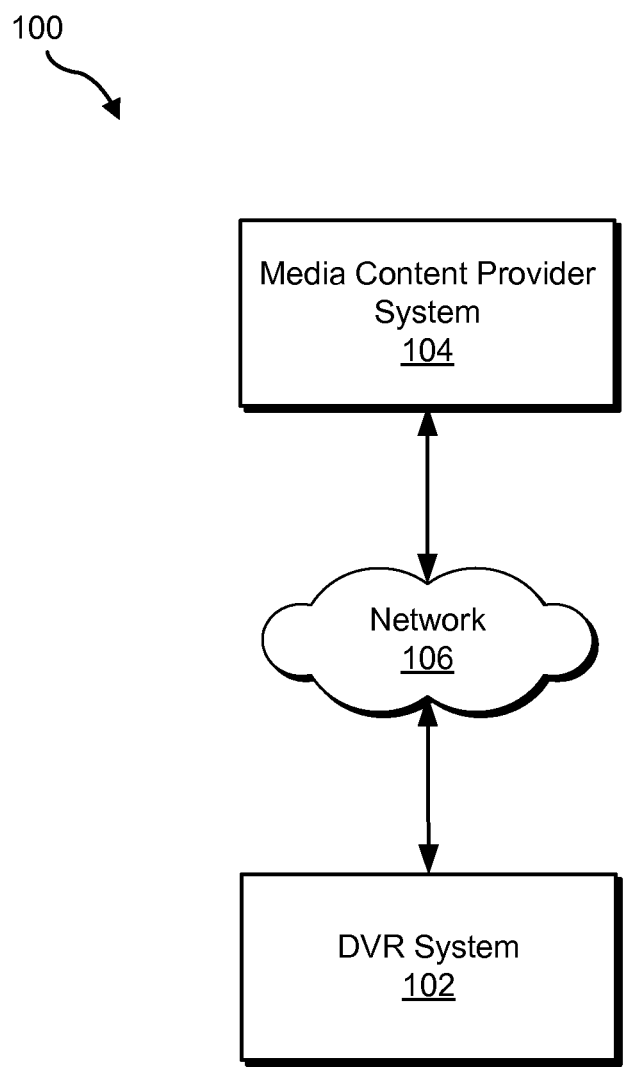
FIG. 1 illustrates an exemplary configuration in which a DVR system is communicatively coupled to a media content provider system according to principles described herein.

Methods and systems for recovering media content lost due to a channel change event are described herein. As will be described below, a media content recovery system may 1) detect that a DVR device is tuned to a first channel used by a media content provider to distribute a first media content program, 2) dynamically store, in response to the detection, first program data representative of the first media content program in a local buffer residing on the DVR device and in a recovery buffer as the first media content program is distributed by the media content provider, and 3) direct the DVR device to use the first program data stored in the local buffer to present the first media content program by way of a display while the DVR device is tuned to the first channel. While the first media content program is being presented, the media content recovery system may detect a first channel change event in which the DVR device switches from being tuned to the first channel to being tuned to a second channel used by the media content provider to distribute a second media content program. In response, the media content recovery system may 1) clear the first program data from the local buffer, 2) dynamically store second program data representative of the second media content program in the local buffer as the second media content program is distributed by the media content provider, 3) direct the DVR device to use the second program data stored in the local buffer to present the second media content program by way of the display, and 4) continue to dynamically store, while the second media content program is being presented by way of the display, the first program data in the recovery buffer as the first media content program is distributed by the media content provider.

By continuing to store the first program data representative of the first media content program distributed by the media content provider by way of the first channel in the recovery buffer after the DVR device tunes to the second channel, the methods and systems described herein may allow the user to resume watching the first media content program when the DVR device tunes back to the first channel as though the DVR device had never tuned away from the first channel in the first place.

To illustrate, a user may direct a DVR device to tune to a first channel used by a media content provider to distribute (e.g., broadcast) a football game. In response, the media content recovery system described herein may dynamically store (e.g., buffer) first program data representative of the football game in both a local buffer residing on the DVR device and in a recovery buffer as the football game is being distributed by way of the first channel. As will be described below, the recovery buffer may reside on the DVR device, on another DVR device communicatively coupled to the DVR device, on a server remote from the DVR device (e.g., a server associated with the media content provider), and/or at any other location. The DVR device may use the first program data stored in the local buffer to present the football game by way of a display (e.g., a television connected to the DVR device) while the DVR device is tuned to the first channel.

While the football game is being presented, the user may pause the football game to go to another room (e.g., to go to the kitchen to make a snack). While the user is out of the room, someone (e.g., the user's child) may direct (either inadvertently or intentionally) the DVR device to switch from being tuned to the first channel to being tuned to a second channel used by the media content provider to distribute a news program. In response, the media content recovery system may clear the first program data representative of the football game from the local buffer and begin storing (e.g., buffering) second program data representative of the news program in the local buffer. However, while the DVR device uses the second program data stored in the local buffer to present the news program by way of the display, the media content recovery system still continues to dynamically store the first program data representative of the football game in the recovery buffer as the football game is distributed by way of the first channel.

Upon reentering the room in which the display is located, the user may see that the DVR device has switched to being tuned to the second channel. The user may accordingly direct the DVR device to switch back to being tuned to the first channel (e.g., by providing a channel change command with a remote control device). In response to the DVR device switching back to being tuned to the first channel, the media content recovery system may access presentation metadata maintained by the media content recovery system and, based on the presentation metadata, determine that the DVR device had been recently tuned to the first channel and that a recovery buffer containing the first program data representative of the football game exists. The media content recovery system may then direct the DVR device to use the first program data stored in the recovery buffer to resume the presentation of the football game starting at a playout position corresponding to when the user had paused the football game.

As used herein, the terms "media content" and "media content program" may refer to any media content program, television program, on-demand media program, pay-per-view media program, broadcast media program (e.g., broadcast television program), multicast media program (e.g., multicast television program), narrowcast media program (e.g., narrowcast video-on-demand program), IPTV media content, advertisement, video, movie, audio program, radio program, or any segment, component, or combination of these or other forms of media content that a user may access by way of a DVR device. As used herein, "presenting" and "playing out" a media content program by way of a display by a DVR device will be used interchangeably.

FIG. 1 illustrates an exemplary configuration 100 in which a DVR system 102 is communicatively coupled to a media content provider system 104. As will be described below, various components of the media content recovery system described herein may be implemented by DVR system 102 and/or media content provider system 104.

DVR system 102 and media content provider system 104 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

DVR system 102 and media content provider system 104 may communicate using any suitable network. For example, as shown in FIG. 1, DVR system 102 and media content provider system 104 may be configured to communicate with each other by way of network 106. Network 106 may include one or more networks or types of networks capable of carrying communications and/or data signals between DVR system 102 and media content provider system 104. For example, network 106 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

Media content provider system 104 may be associated with a media content provider that distributes media content, such as a service provider (e.g., a subscriber television service provider, an Internet service provider, a DVR service provider, etc.), a media content program provider (e.g., ESPN, NBC, etc.), and/or any other type of media content provider. Accordingly, media content provider system 104 may be configured to provide one or more media content services (e.g., DVR services, television services, video-on-demand services, Internet services, application services, etc.) to DVR system 102 and/or to users by way of DVR system 102. For example, media content provider system 104 may be configured to manage (e.g., maintain, process, distribute, and/or generate) media content (e.g., media content programs, advertisements, etc.) configured to be delivered to DVR system 102. Media content provider system 104 may be implemented by one or more computing devices as may serve a particular implementation.

DVR system 102 may facilitate access by one or more users to media content (e.g., media content programs) provided by media content provider system 104. For example, DVR system 102 may present and/or record (e.g., concurrently) multiple media content programs at the direction of one or more users. To this end, DVR system 102 may include a plurality of tuners. Each tuner may be configured to be tuned to a particular channel used by a media content provider to distribute a media content program at the direction of DVR system 102 and/or at the direction of a user of DVR system 102. This may be performed in any suitable manner. For example, a tuner may tune to a channel used by a media content provider to broadcast, narrowcast, or multicast a media content program. Additionally or alternatively, a tuner may tune to a channel by tuning (e.g., switching) to a digital stream of data packets (e.g., Internet Protocol ("IP") based data packets) carrying a media content program. Hence, as used herein, a "tuner" may be implemented by one or more hardware components and/or one or more software components.

In some examples, the total number of tuners associated with DVR system 102 may depend on the number of physical tuners included in each DVR device included within DVR system 102. Alternatively, the total number of tuners associated with DVR system 102 may be specified in accordance with a DVR service plan provided by a DVR service provider. For example, a family may subscribe to a DVR service in which the family is allocated a predetermined number of tuners (e.g. six tuners). The family may then utilize up to the predetermined number of tuners (e.g., by directing DVR system 102 to concurrently present and/or record up to six different media content programs). The DVR service may subsequently be updated to provide a different number of tuners to the family. For example, the family may upgrade their DVR service subscription to increase the predetermined number of tuners allocated to them.

Figure 2:
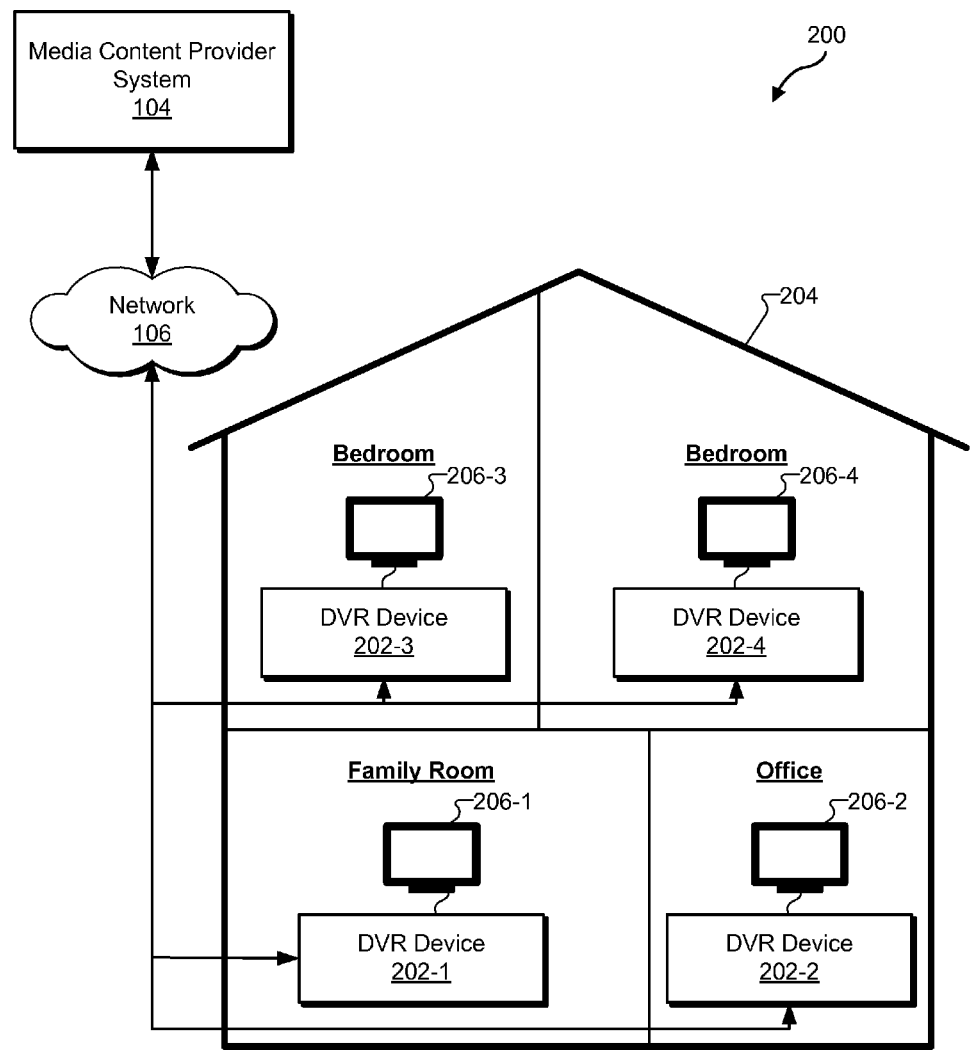
FIG. 2 shows an exemplary implementation of the DVR system of FIG. 1 according to principles described herein.

DVR system 102 may be implemented by any suitable combination of DVR devices. Each DVR device may include a local processing device (i.e., a processing device that the user interacts with directly such as a set-top box device, a receiver, a personal computer, a mobile device (e.g., a mobile phone and/or tablet computer), a personal-digital assistant device, a gaming device, a television device, etc.). To illustrate, FIG. 2 shows an exemplary implementation 200 of DVR system 102 in which DVR system 102 is implemented by a plurality of DVR devices 202 (e.g., DVR devices 202-1 through 202-4) located within a particular premises 204 (e.g., a home). Each DVR device 202 may be implemented by one or more of the local processing devices described herein. For example, each DVR device may be implemented by a set-top box device having DVR capabilities. It will be recognized that although multiple DVR devices 202 are illustrated in FIG. 2, DVR system 102 may alternatively be implemented by a single DVR device (e.g., DVR device 202-1).

As shown, DVR devices 202 may be distributed throughout premises 204. For example, FIG. 2 shows that DVR devices 202 are distributed throughout various rooms of premises 204. In this manner, users located within premises 204 may experience and/or otherwise interact with media content at various locations throughout premises 204.

DVR devices 202 may each be associated with (e.g., connected to) a display 206 (e.g., displays 206-1 through 206-4). Displays 206 may include any suitable display device separate from DVR devices 202 (e.g., televisions, computer monitors, etc.) and/or any suitable display device integrated into DVR devices 202 (e.g., display screens). DVR devices 202 may be configured to present media content by way of displays 206.

As shown, each DVR device 202 may be communicatively coupled to media content provider system 104 by way of network 106. This may be realized in any suitable manner. In some examples, each DVR device 202 may be communicatively coupled one to another by way of a local area network ("LAN"). In this configuration, as will be described below, DVR devices 202 may communicate one with another and/or transmit data one to another.

Figure 3:
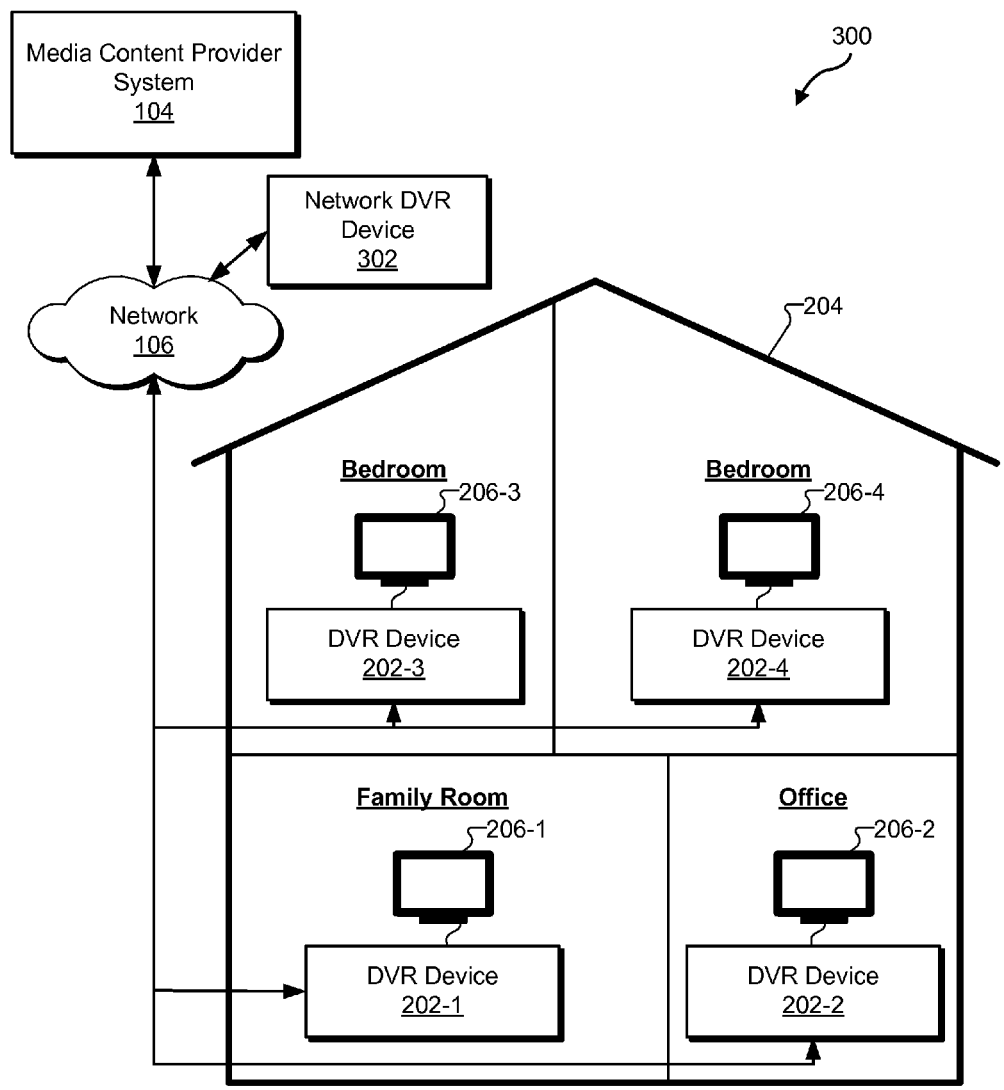
FIG. 3 shows another exemplary implementation of the DVR system of FIG. 1 according to principles described herein.

DVR system 102 may additionally or alternatively be implemented by one or more remote processing devices. For example, FIG. 3 shows another exemplary implementation 300 of DVR system 102 in which DVR system 102 is at least partially implemented by a network DVR device 302. Network DVR device 302 may be implemented by one or more computing devices (e.g., one or more servers) configured to provide DVR services.

As shown, network DVR device 302 may be remote from premises 204 and may be configured to communicate with DVR devices 202 and media content provider system 104 by way of network 106. In this implementation, network DVR device 302 may perform one or more DVR operations traditionally performed by local DVR devices. For example, network DVR device 302 may record and/or store media content programs, stream media content programs to DVR devices 202, and/or perform any other DVR operation as may serve a particular implementation. Each DVR device 202 may be configured to interface with network DVR device 302 such that one or more users located within premises 204 may direct network DVR device 302 to perform one or more DVR operations.

In some examples, network DVR device 302 may be associated with and/or maintained by a media content provider and/or a service provider associated with media content provider system 104. For example, network DVR device 302 may be located at a premises maintained by a subscriber television service provider.

Figure 4:
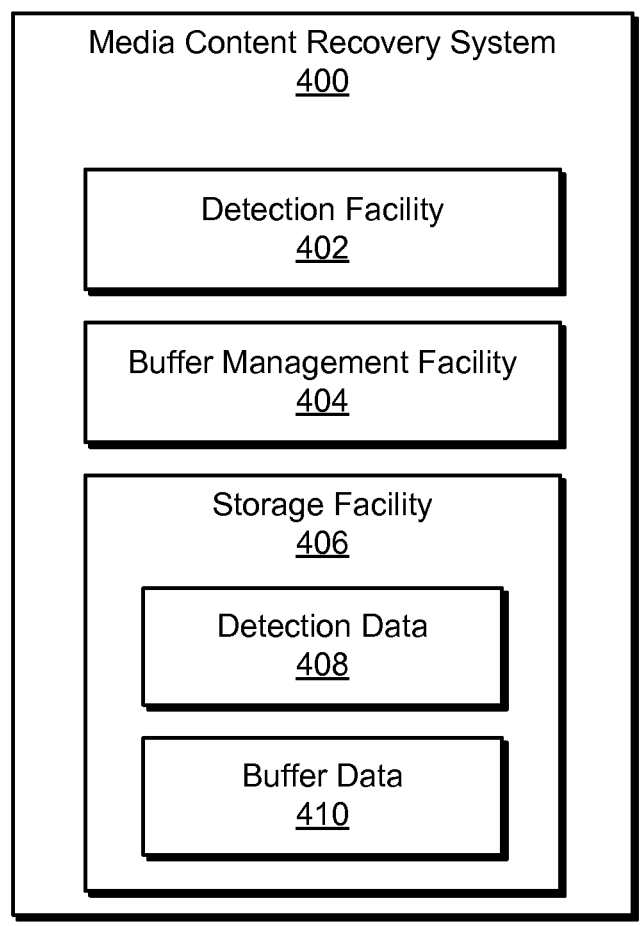
FIG. 4 illustrates an exemplary media content recovery system according to principles described herein.

FIG. 4 illustrates an exemplary media content recovery system 400 ("system 400") that may be used to recover media content lost due to a channel change event performed by a DVR device (e.g., one of DVR devices 202). System 400 may be implemented by DVR system 102, media content provider system 104, one or more of DVR devices 202, and/or any other combination of computing devices.

As shown, system 400 may include a detection facility 402, a buffer management facility 404, and a storage facility 406 selectively and communicatively coupled to one another. Storage facility 406 may be configured to maintain detection data 408 generated and/or used by detection facility 402 and buffer data 410 generated and/or used by buffer management facility 404. Storage facility 406 may maintain additional or alternative data as may serve a particular implementation. It will be recognized that although facilities 402-406 are shown to be separate facilities in FIG. 4, any of facilities 402-406 may be combined into fewer facilities, such as into a single facility, or divided into more facilities as may serve a particular implementation.

Detection facility 402 may detect that a DVR device is tuned to a first channel used by a media content provider to distribute a first media content program. This may be performed in any suitable manner. For example, detection facility 402 may detect that a tuner included in or otherwise used by the DVR device is tuned to the first channel. Other operations that may be performed by detection facility 402 will be described in more detail below.

Buffer management facility 404 may be configured to perform one or more buffer management operations. For example, in response to detection facility 402 detecting that the DVR device is tuned to the first channel, buffer management facility 404 may dynamically store (e.g., buffer) first program data representative of the first media content program in a local buffer residing on the DVR device and in a recovery buffer as the first media content program is distributed by the media content provider. As will be described in more detail below, the recovery buffer may reside on the DVR device, on an additional DVR device communicatively coupled to the DVR device, on a server remote from the DVR device, and/or at any other suitable location. Examples of storing the first program data in both the local buffer and the recovery buffer will be provided below.

Buffer management facility 404 may direct the DVR device to use the first program data stored in the local buffer to present the first media content program by way of a display while the DVR device is tuned to the first channel. For example, in response to the DVR device tuning to the first channel, buffer management facility 404 may immediately begin buffering the first program data representative of the first media content program carried by way of the first channel in the local buffer. After a short delay (which allows the first program data to buffer for a predetermined amount of time), buffer management facility 404 may direct the DVR device to begin using the first program data stored in the local buffer to present the media content program by way of the display. In this manner, the user may experience the media content program in a nonlinear manner. For example, the user may pause, rewind, fast forward, or otherwise interact with the media content program in a nonlinear fashion. While the first media content program is being presented by way of the display, buffer management facility 404 may continue to store the first program data representative of the first media content program in the local buffer and the recovery buffer as the first media content program is distributed by the media content provider.

In some examples, buffer management facility 404 may maintain presentation metadata associated with the presentation of the first media content program. The presentation metadata may be representative of a channel identifier (e.g., a channel number) associated with the first channel, a buffer depth of the local buffer, a playout pointer position within the local buffer, and/or any other attribute associated with the presentation of the first media content program.

Figure 5:
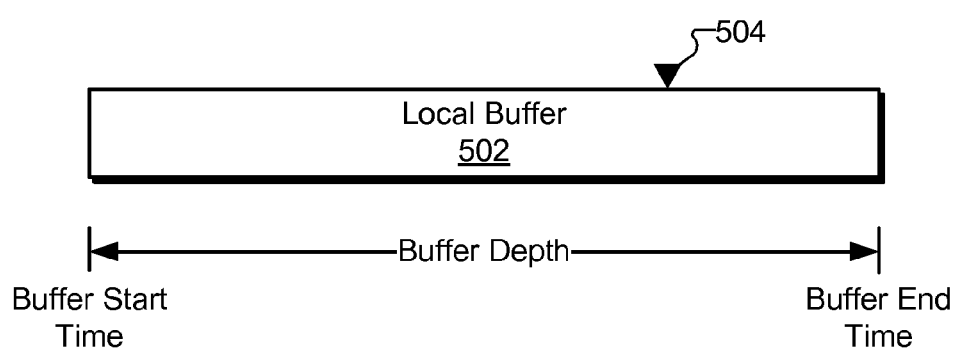
FIG. 5 shows an exemplary local buffer according to principles described herein.

To illustrate buffer depth and playout pointer position, FIG. 5 shows an exemplary local buffer 502 within which buffer management facility 404 may store program data representative of a media content program being carried by way of a channel to which a DVR device is tuned. It will be recognized that program data is typically temporarily stored within the local buffer. In other words, the program data may be cleared in response to a channel change event in which the DVR device tunes to a different channel.

As shown, the buffer depth (i.e., size) of local buffer 502 may be dependent on the amount of time that program data is stored within local buffer 502. For example, if buffer management facility 404 begins storing program data in local buffer 502 at a buffer start time of 12:00:00 pm and stops storing program data in local buffer 502 at a buffer end time of 12:30:30 pm, the buffer depth of local buffer 502 is 30 minutes and 30 seconds. It will be recognized that depending on the video transmission techniques used, timing indications can be made frame-accurate. Hence, the buffer start and end times may be indicated in the format of HH:mm:ss:ff (i.e., hours:minutes:seconds;frame).

FIG. 5 also shows a playout pointer 504 associated with local buffer 502. Playout pointer 504 indicates a temporal position, referred to as a "playout pointer position," within local buffer 502 at which the DVR device is playing out (i.e., presenting) the media content program represented by the program data stored in local buffer 502. For example, if the buffer depth of local buffer 502 is 30 minutes and 30 seconds as described above, playout pointer 504 in FIG. 5 is located at a playout pointer position that is approximately 22 minutes after the buffer start time.

In some examples, buffer management facility 404 may continually update the presentation metadata (e.g., the buffer depth and the playout pointer position) associated with the presentation of the first media content program as the user interacts with the presentation of the first media content program and as the first program data is received from the media content provider. In this manner, as will be described in more detail below, buffer management facility 404 may readily ascertain how to restore the presentation of the first media content program in the event of an inadvertent or undesirable channel change.

In some examples, while the first media content program is being presented, detection facility 402 may detect a first channel change event in which the DVR device switches from being tuned to the first channel to being tuned to a second channel used by the media content provider to distribute a second media content program. Detection facility 402 may detect this and other channel change events in any suitable manner. For example, detection facility 402 may detect the first channel change event by detecting one or more channel change commands provided by a user of the DVR device. The one or more channel change commands may be provided using, for example, a remote control device associated with the DVR device. It will be recognized that when the DVR device switches from being tuned to the first channel to being tuned to the second channel, the DVR device may still be tuned to the first channel (i.e., the DVR device may be concurrently tuned to both the first and second channels). Hence, references to the DVR device switching from being tuned to a first channel to being tuned to a second channel refer to the DVR device switching from presenting a first media content program carried by way of the first channel to presenting a second media content program carried by way of the second channel.

In response to the first channel change event, buffer management facility 404 may clear (e.g., delete) the first program data from the local buffer and dynamically store second program data representative of the second media content program in the local buffer as a second media content program is distributed by the media content provider by way of the second channel. Buffer management facility 404 may then direct the DVR device to use the second program data stored in the local buffer to present the second media content program by way of the display. In this manner, the second media content program may be experienced by the user using in a nonlinear manner.

In some examples, buffer management facility 404 may continue to dynamically store the first program data representative of the first media content program in the recovery buffer as the first media content program is distributed by the media content provider, even though the DVR device is presenting the second media content program by way of the display. In this manner, as will be described below, the first program data may be recovered if the user directs the DVR device to tune back to the first channel.

In some examples, buffer management facility 404 may continue to dynamically store the first program data in the recovery buffer for a predetermined amount of time (e.g., fifteen to thirty minutes or any other amount of time) subsequent to the first channel change event. If, within the predetermined amount of time, the DVR device does not tune back to the first channel, buffer management facility 404 may determine that the user is not interested in resuming the presentation of the first media content program and clear the first program data from the recovery buffer in order to free up system resources.

Additionally or alternatively, buffer management facility 404 may continue to dynamically store the first program data in the recovery buffer while a predetermined number of additional channel change events occur subsequent to the first channel change event. If none of these channel change events include the DVR device switching back to being tuned to the first channel, buffer management facility 404 may determine that the user is not interested in resuming the presentation of the first media content program and clear the first program data from the recovery buffer in order to free up system resources.

While the second media content program is being presented by the DVR device, detection facility 402 may detect a second channel change event in which the DVR device switches from being tuned to the second channel back to being tuned to the first channel. In response, buffer management facility 404 may access presentation metadata maintained by buffer management facility 404 to determine whether the DVR device was previously tuned to the first channel (e.g., within a predetermined amount of time prior to the second channel change event or within a predetermined number of channel change events prior to the second channel change event).

To illustrate, FIG. 6 shows exemplary presentation metadata 600 that may be maintained by buffer management facility 404. As shown, presentation metadata 600 includes entries for three channels (e.g., channels having channel identifiers of "channel 5", "channel 13", and "channel 17"). Presentation metadata 600 may also include data representative of a buffer depth (e.g., a buffer start time and a buffer end time) and a playout pointer position associated with the local buffer while the DVR device was tuned to each channel. For example, presentation metadata 600 indicates that buffer management facility 404 began storing program data representative of a media content program carried by way of channel 5 in the local buffer at a buffer start time of 10:24:12 and that buffer management facility 404 ended storing the program data representative of the media content program carried by way of channel 5 in the local buffer at 11:12:42. Hence, the buffer depth of the local buffer at a time associated with a channel change event in which the DVR device tuned away from channel 5 is 48 minutes and 30 seconds. Likewise, presentation metadata 600 indicates that the playout pointer position within the local buffer at the time that the DVR device tuned away from channel 5 has a timestamp of 10:48:01 (i.e., 23 minutes and 49 seconds after the buffer start time).

In some examples, in response to the DVR device switching from being tuned to the second channel back to being tuned to the first channel, buffer management facility 404 may determine that a channel identifier associated with the first channel matches a channel identifier included in the presentation metadata maintained by buffer management facility 404 (e.g., presentation metadata 600). In response to this determination, buffer management facility 404 may use the recovery buffer associated with the first channel to restore playout of the first media content program.

For example, buffer management facility 404 may determine, by accessing the presentation metadata, a playout pointer position within the local buffer at a time associated with the first channel change event (e.g., at a time that the DVR switched from being tuned to the first channel to being tuned to the second channel). Buffer management facility 404 may then identify a playout pointer position within the recovery buffer that matches the playout pointer position within the local buffer at the time associated with the first channel change event and direct the DVR device to use the first program data stored in the recovery buffer to resume the presentation of the first media content program by way of the display starting at the identified playout pointer position.

Buffer management facility 404 may be configured to perform various other operations in response to the DVR device switching from being tuned to the second channel back to being tuned to the first channel. For example, in response to the DVR device switching from being tuned to the second channel back to being tuned to the first channel, buffer management facility 404 may clear the second program data from the local buffer and dynamically store third program data representative of the first media content program in the local buffer beginning at a time associated with the second channel change event. In other words, once the DVR device tunes back to the first channel, buffer management facility 404 may begin storing program data representative of the first media content program as the first media content program is distributed by the media content provider. This may be performed while the DVR device uses the first program data stored in the recovery buffer to present the first media content program. Buffer management facility 404 may then detect, during the presentation of the first media content program, a playout depletion of the recovery buffer (i.e., when the portion of the first media content program represented by the first program data stored in the recovery buffer has been presented) and, in response, direct the DVR device to switch to using the third program data stored in the local buffer to continue the presentation of the first media content program by way of the display.

Figure 7:
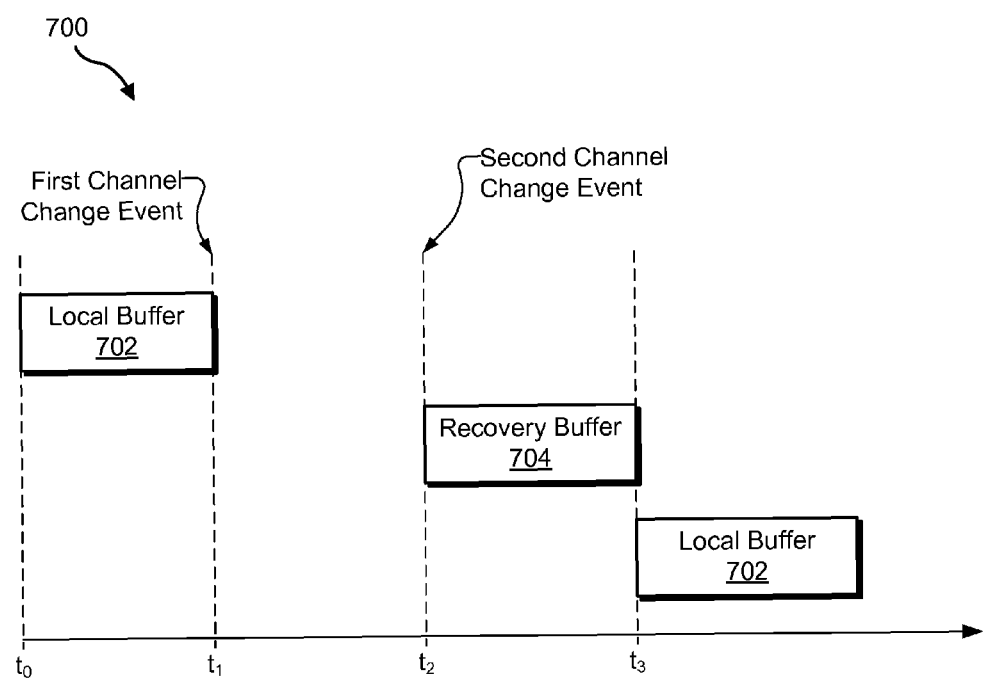
FIG. 7 shows an exemplary presentation timeline associated with a presentation of a media content program according to principles described herein.

To illustrate, FIG. 7 shows an exemplary presentation timeline 700 associated with a presentation of the first media content program described above. As shown, the DVR device uses data stored in a local buffer 702 to present the first media content program between times $t_0$ and $t_1$. However, at time $t_1$, the first channel change event occurs in which the DVR device tunes to the second channel. The DVR device remains tuned to the second channel between times $t_1$ and $t_2$. Hence, the first media content program is not presented during this time period, even though data representative of the first media content program continues to be stored in a recovery buffer 704. At time $t_2$, the second channel change event occurs in which the DVR device tunes back to the first channel. In response, as shown in FIG. 7, the DVR device uses the data stored in the recovery buffer 704 to continue the presentation of the first media content program where the DVR device left off at time $t_1$. Data representative of the first media content program is concurrently stored in the local buffer 702 (and, in some embodiments, in recovery buffer 704) beginning at time $t_2$ as the first media content program is distributed by the media content provider. A playout depletion of the recovery buffer (i.e., when the playout of the first media content program reaches a playout position where the data representative of the first media content program is stored again in local buffer 702) occurs at time $t_3$, at which point the DVR device switches to using the newly stored data in the local buffer 702 to continue the presentation of the first media content program.

In some examples, it may be desirable to restore the contents of the recovery buffer to the local buffer. For example, as will be described in more detail below, the recovery buffer may be stored on a server remote from the DVR device. By restoring the contents of the recovery buffer to the local buffer, the DVR device may use the contents of the local buffer to present the first media content program, which may be advantageous in terms of performance.

To illustrate, while the DVR device uses the first program data stored in the recovery buffer to present the first media content program by way of the display, buffer management facility 404 may restore the first program data included in the recovery buffer to the local buffer. This may be performed in any suitable manner. For example, buffer management facility 404 may copy or otherwise transfer the first program data included in the recovery buffer to the local buffer. In some examples, buffer management facility 404 may access the presentation metadata to identify the buffer depth of the local buffer at the time associated with the first channel change event (i.e., at the time that the DVR device tuned away from the first channel). Buffer management facility 404 may then transfer a matching buffer depth amount of first program data included in the recovery buffer to the local buffer. Once the first program data has been completely restored to the local buffer, buffer management facility 404 may direct the DVR device to use the first program data stored in the local buffer instead of the first program data stored in the recovery buffer to present the first media content program by way of the display.

Various configurations in which a recovery buffer may be used to restore playout of a first media content program after an inadvertent or undesirable channel change event occurs will now be described. It will be recognized that the configurations described herein are merely illustrative and that additional or alternative configurations may be used as may serve a particular implementation.

Figure 8:
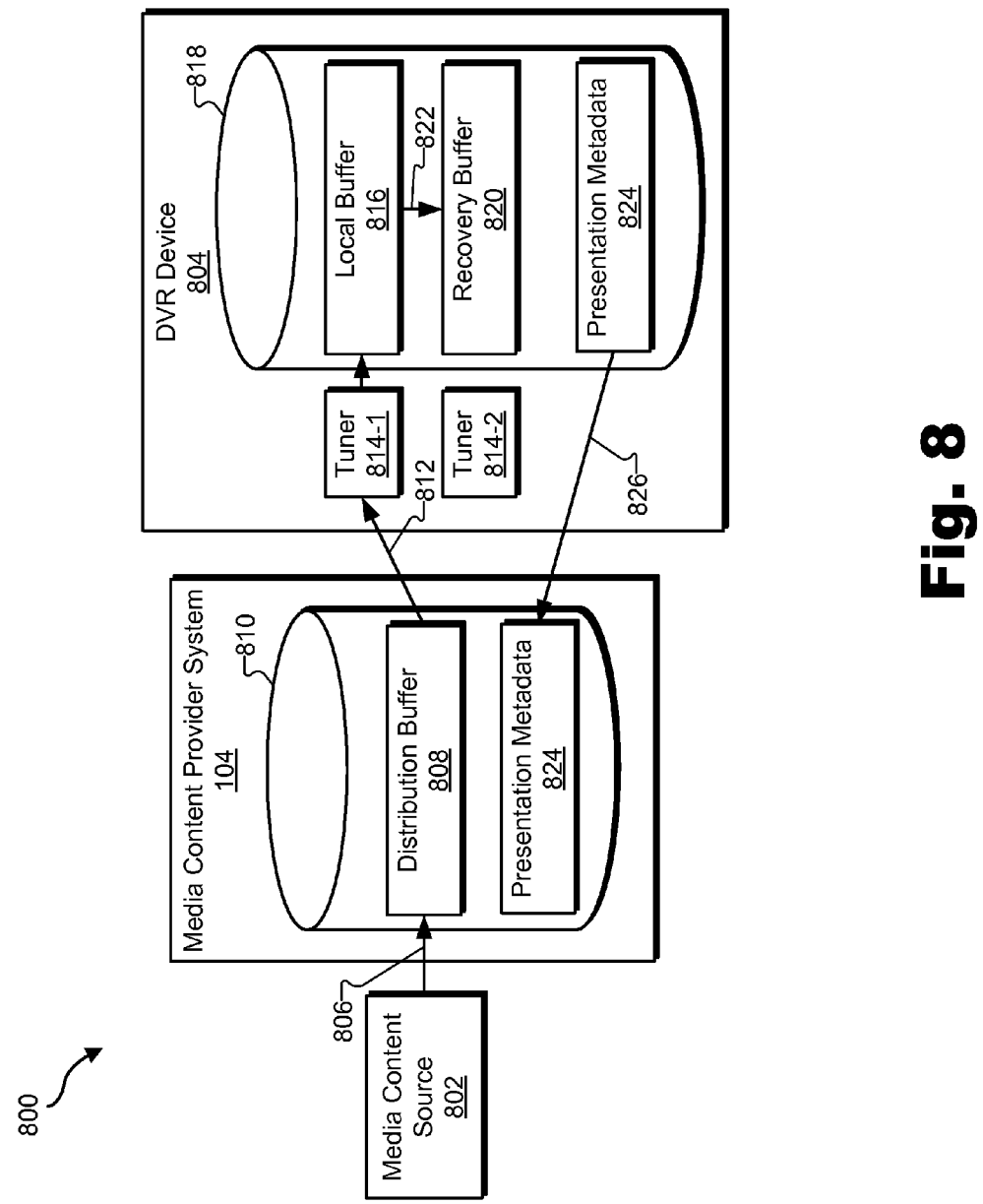
FIGS. 8-11 show various configurations in which a recovery buffer may be used to restore playout of a media content program after an inadvertent or undesirable channel change event occurs according to principles described herein.

FIG. 8 shows an exemplary configuration 800 in which media content provider system 104 distributes a first media content program provided by a media content source 802 to a DVR device 804 by way of a first channel. Media content source 802 may include any source of media content, such as one or more components associated with a media content program provider (e.g., ESPN, NBC, etc.). As illustrated by arrow 806, media content source 802 may transmit data representative of the first media content program to media content provider system 104. As will be described below, arrow 806 generally represents data representative of any media content program being transmitted by media content source 802 to media content provider system 104.

Media content provider system 104, which may be implemented by one or more servers or other media content distribution components associated with a media content provider, may receive the data representative of the first media content program and distribute the first media content program using any suitable distribution heuristic. In some examples, as part of the distribution process, media content provider system 104 may store the data representative of the first media content program in a distribution buffer 808 maintained in a storage medium 810 associated with media content provider system 104. This may be done in any suitable manner. The data representative of the first media content program may be maintained in distribution buffer 808 for any suitable amount of time. In some examples, as will be described below, the distribution buffer 808 may serve as a recovery buffer used to restore playout of the content program after an inadvertent or undesirable channel change is performed by DVR device 804.

As illustrated by arrow 812, the data representative of the media content program stored in distribution buffer 808 may be distributed (e.g., transmitted by way of a first channel) to DVR device 804. The data may be received by a tuner 814-1 included within DVR device 804. In the example of FIG. 8, DVR device 804 includes two tuners 814 (e.g., tuner 814-1 and tuner 814-2).

As described above, the data received by tuner 814-1 may be dynamically stored as program data in a local buffer 816 maintained in a storage medium 818 associated with (e.g., included within) DVR device 804. The program data stored in local buffer 816 may be used to play out the first media content program by way of a display associated with DVR device 804.

As shown, a recovery buffer 820 may reside on DVR device 804 (e.g., within storage medium 818). Recovery buffer 820 is shown to be separate from local buffer 816 for illustrative purposes. As will be described below, recovery buffer 820 may alternatively be the same buffer as local buffer 816 (i.e., local buffer 816 may serve as recovery buffer 820).

In the configuration 800 of FIG. 8, DVR device 804 may dynamically store data representative of the first media content program in recovery buffer 820 while the first media content program is being distributed by media content provider system 104 by copying the program data stored in local buffer 816 into recovery buffer 820. This copying is represented by arrow 822 in FIG. 8, and may be performed in any suitable manner.

FIG. 8 also shows that DVR device 804 may maintain presentation metadata 824 locally within storage medium 818. As described above, presentation metadata 824 may be representative of a channel identifier (e.g., a channel number) associated with the first channel used to distribute the first media content program, a buffer depth of local buffer 816 while local buffer 816 is used to present the first media content program, and a playout pointer position within local buffer 816 while local buffer 816 is used to present the first media content program.

As shown by arrow 826, media content provider system 104 may also maintain presentation metadata 824 within storage medium 810. To this end, DVR device 804 may continuously transmit presentation metadata 824 to media content provider system 104 as presentation metadata 824 is updated during the presentation of the first media content program. It will be recognized that, in some examples, presentation metadata 824 is only maintained by DVR device 804.

Figure 9:
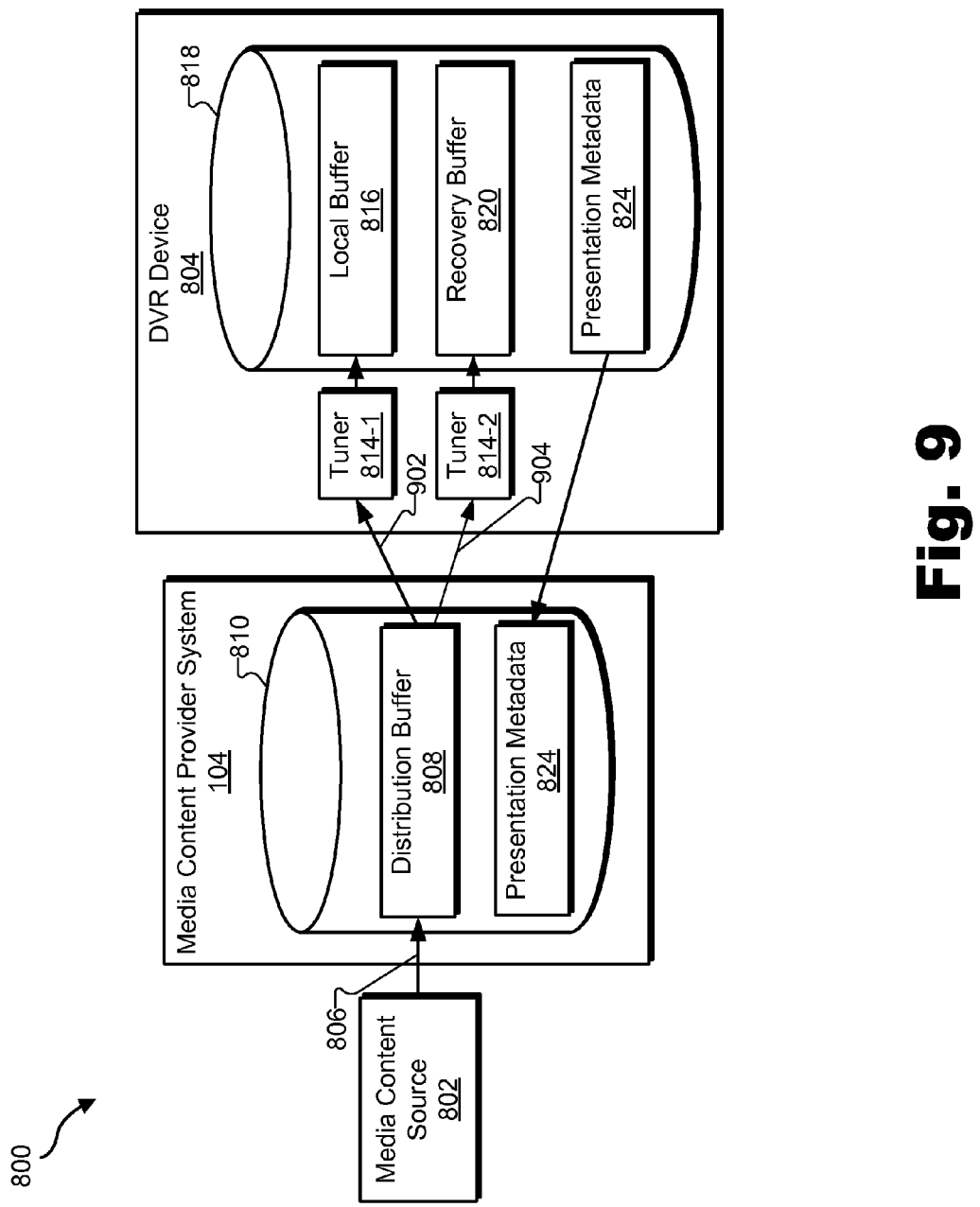

FIG. 9 shows configuration 800 after DVR device 804 has tuned to a second channel carrying a second media content program distributed by media content provider system 104. In this scenario, tuner 814-1 receives data representative of the second media content program from distribution buffer 808, as illustrated by arrow 902. DVR device 804 stores data representative of the second media content program in the form of program data in local buffer 816, which may be used for presentation of the second media content program by way of the display associated with DVR device 804.

While the second media content program is being presented, DVR device 804 may continue to store data representative of the first media content program in recovery buffer 820. In the example of FIG. 9, this is done by tuning tuner 814-2 to the first channel. In this configuration, tuner 814-2 receives data representative of the first media content program, as illustrated by arrow 904. This data is then stored by DVR device 804 in recovery buffer 820. Alternatively, in cases where recovery buffer 820 is the same as local buffer 816, DVR device 804 may store data representative of the second media content program in the form of program data in a new local buffer. In this configuration, DVR device 804 may continue to store data representative of the first media content program in local buffer 816, which may be subsequently used to resume the presentation of the first media content program (i.e., restore playout of the first media content program).

In some alternative examples, the configuration shown in FIG. 9 may also be used to dynamically store program data representative of the first media content program in recovery buffer 820 while DVR device 804 is presenting the first media content program (i.e., before the DVR device 804 tunes to the second channel). In other words, instead of copying program data from local buffer 816 to recovery buffer 820, as illustrated in FIG. 8, both tuners 814-1 and 814-2 may be tuned to the first channel so that local buffer 816 and recovery buffer 820 are concurrently filled with program data representative of the first media content program.

In response to a channel change event in which DVR device 804 tunes back to the first channel, buffer management facility 404 (which may be implemented by DVR device 804, media content provider system 104, and/or any other combination of computing devices) may access presentation metadata 824 stored by DVR device 804 and/or media content provider system 104 to determine that DVR device 804 was previously tuned to the first channel and that a recovery buffer associated with the first media content program exists. Buffer management facility 404 may then use the recovery buffer (i.e., recovery buffer 820 and/or distribution buffer 808) to resume the presentation of the first media content program (i.e., restore playout of the first media content program), as described in more detail above.

In some examples, DVR device 804 does not have available resources to maintain a local recovery buffer (e.g., recovery buffer 820). For example, DVR device 804 may not have a tuner available to tune to the first channel in order to populate the recovery buffer 820 or sufficient storage capacity to maintain the recovery buffer 820. In these instances, buffer management facility 404 may automatically use distribution buffer 808 as the recovery buffer.

Additionally or alternatively, buffer management facility 404 may determine that an additional DVR device communicatively coupled to DVR device 804 (e.g., a DVR device connected to DVR device 804 by way of a LAN) has available resources to maintain a recovery buffer. In response, buffer management facility 404 may create the recovery buffer in the additional DVR device.

Figure 10:
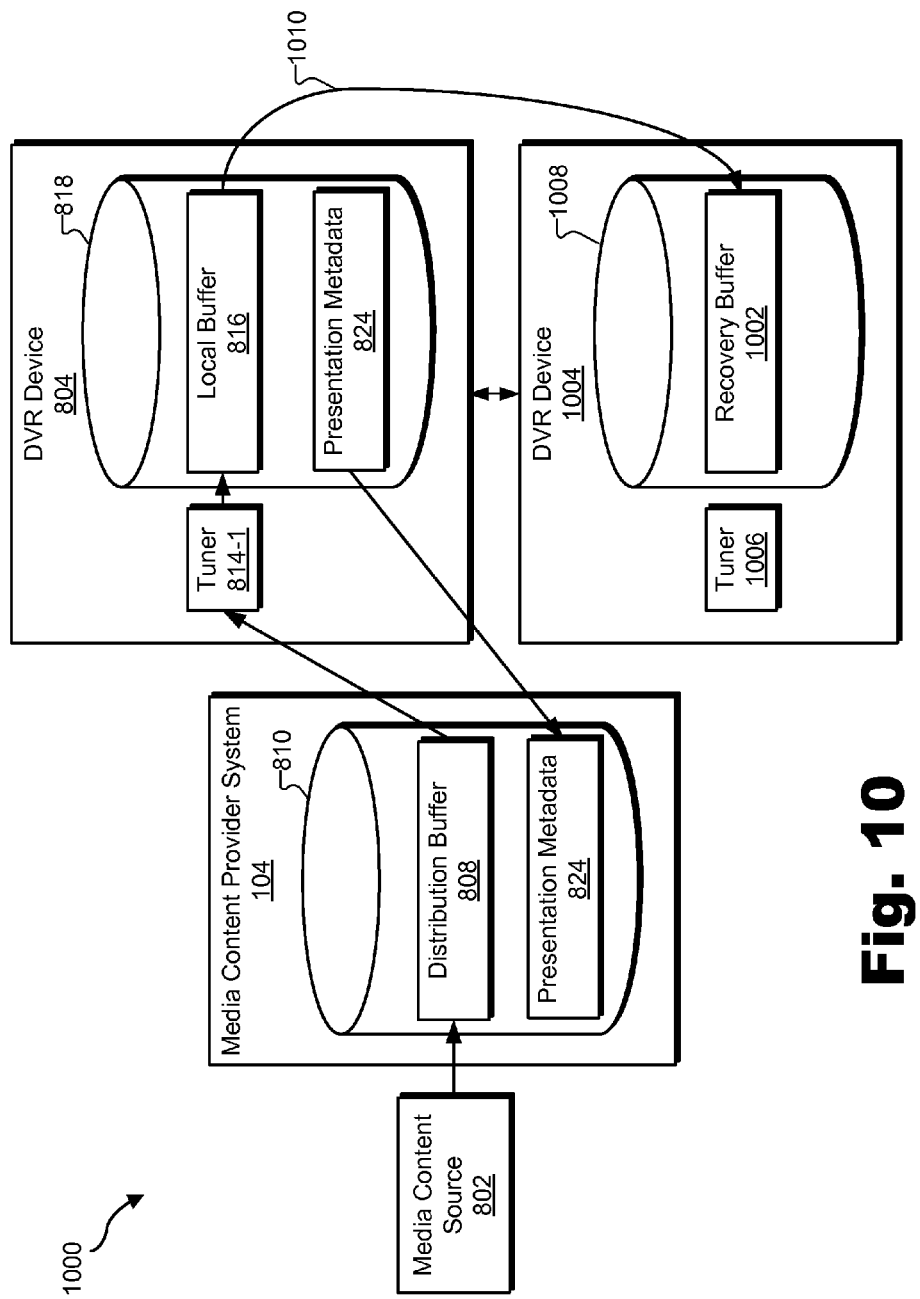

To illustrate, FIG. 10 shows an exemplary configuration 1000 in which a recovery buffer 1002 resides on an additional DVR device 1004 communicatively coupled to DVR device 804 (e.g., by way of a LAN, a direct connection, or any other type of connection). As shown, DVR device 1004 may include a tuner 1006 and a storage medium 1008, which may maintain recovery buffer 1002.

Figure 11:
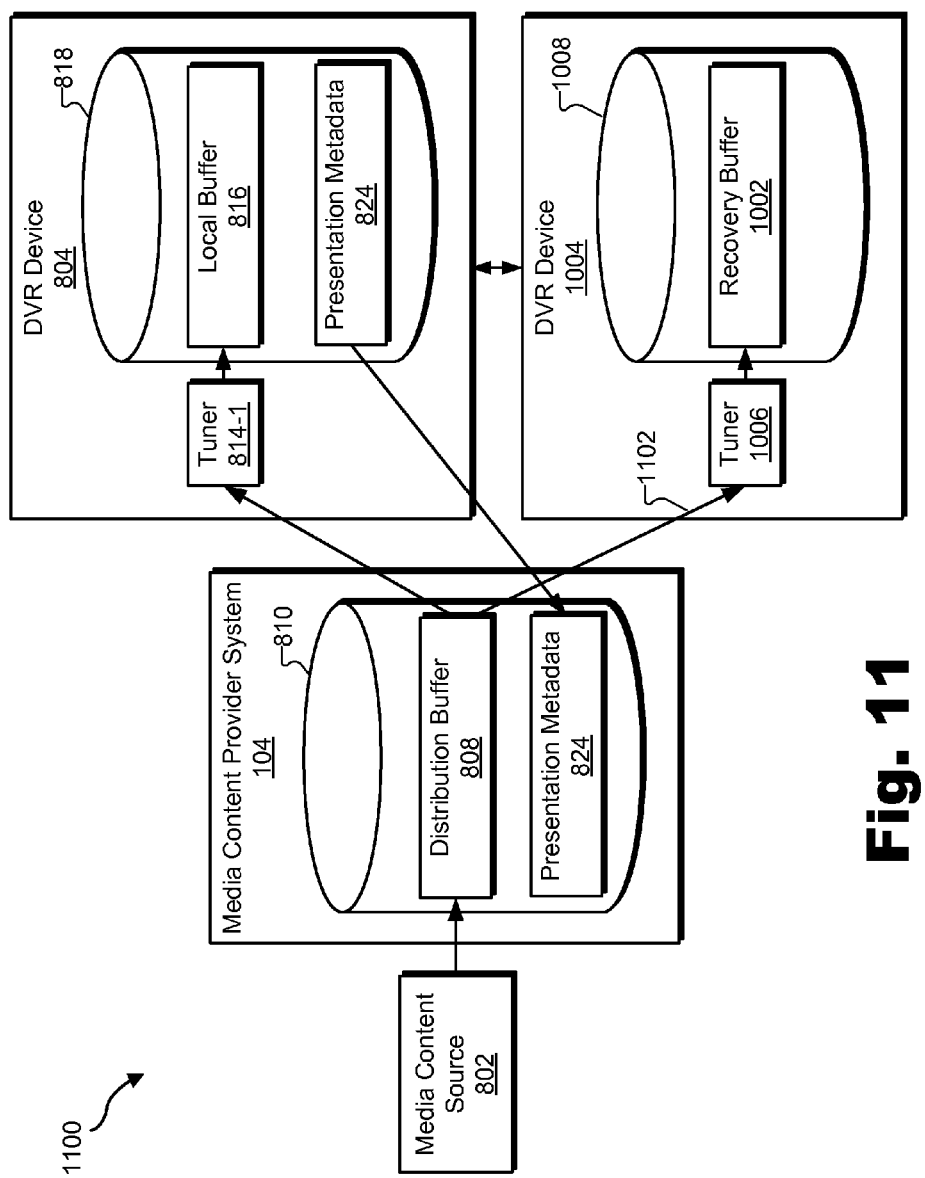

In the configuration 1000 of FIG. 10, program data representative of the first media content program is stored in recovery buffer 1002 by DVR device 804 copying the contents of local buffer 816 into recovery buffer 1002. This copying is represented by arrow 1010. FIG. 11 shows that after DVR device 804 tunes to the second channel, DVR device 1004 may continue storing the program data representative of the first media content program in recovery buffer 1002 by tuning to the first channel with tuner 1006. This is represented by arrow 1102.

In some alternative examples, the configuration shown in FIG. 11 may also be used to dynamically store program data representative of the first media content program in recovery buffer 1002 while DVR device 804 is presenting the first media content program (i.e., before the DVR device 804 tunes to the second channel). In other words, instead of copying program data from local buffer 816 to recovery buffer 1002, as illustrated in FIG. 10, both tuners 814-1 and 1006 may be tuned to the first channel so that local buffer 816 and recovery buffer 1002 are concurrently filled with program data representative of the first media content program.

In some examples, buffer management facility 404 may use multiple recovery buffers to restore playout of a media content program. For example, buffer management facility 404 may use recovery buffer 820, distribution buffer 808, and/or recovery buffer 1002 to restore playout of various portions of a media content program. For example, DVR devices 804 and 1004 may lack resources to be able to continue to store program data representative of the first media content program in response to a channel change event in which DVR device 804 tunes to the second channel. In this situation, buffer management facility 404 may use program data stored in recovery buffer 820 and in distribution buffer 808 to restore playout of the media content program after the DVR device 804 tunes back to the first channel.

It will be recognized that multiple local buffers and multiple recovery buffers may be maintained as a DVR device performs various channel change events. For example, a recovery buffer may be maintained for the second media content program in a similar manner to that described with respect to the first media content program.

Figure 12:
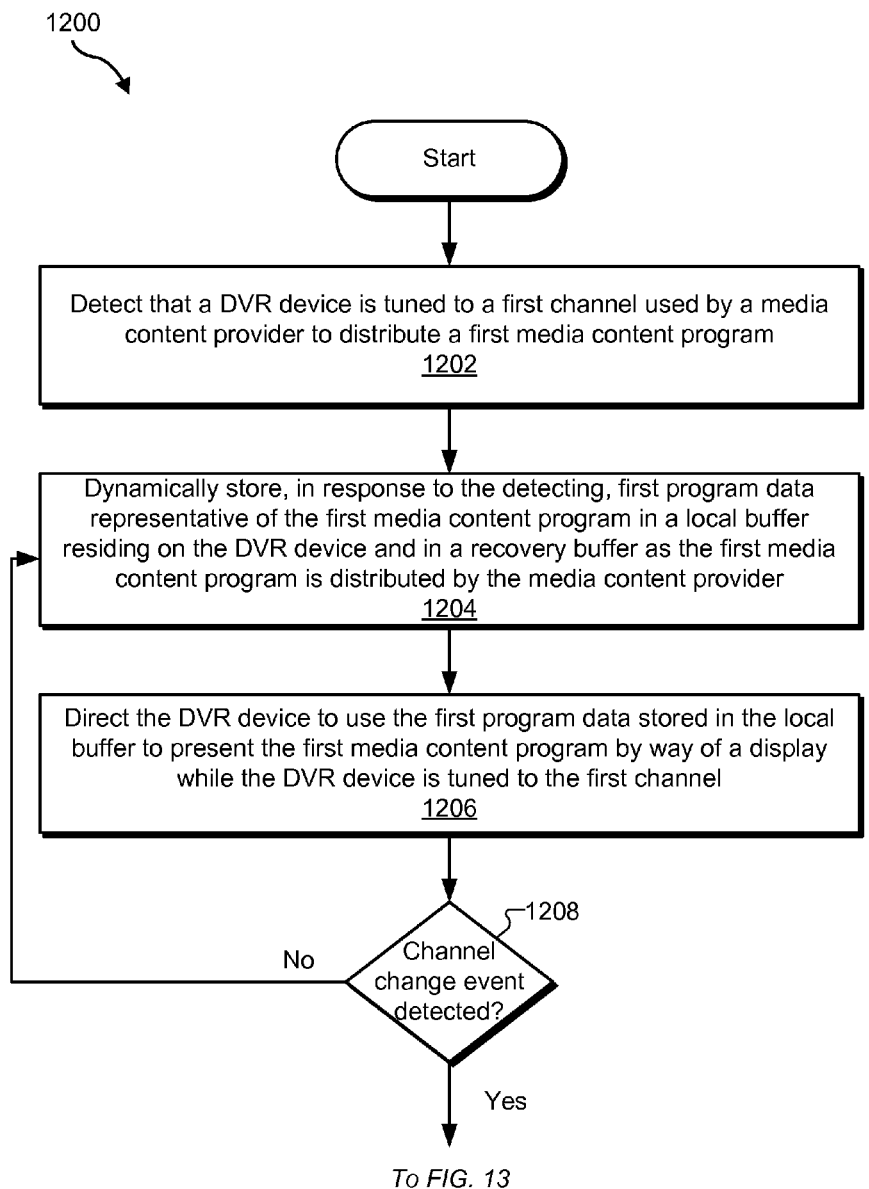
FIGS. 12-14 illustrate exemplary methods of recovering media content lost due to a channel change event according to principles described herein.
Figure 13:
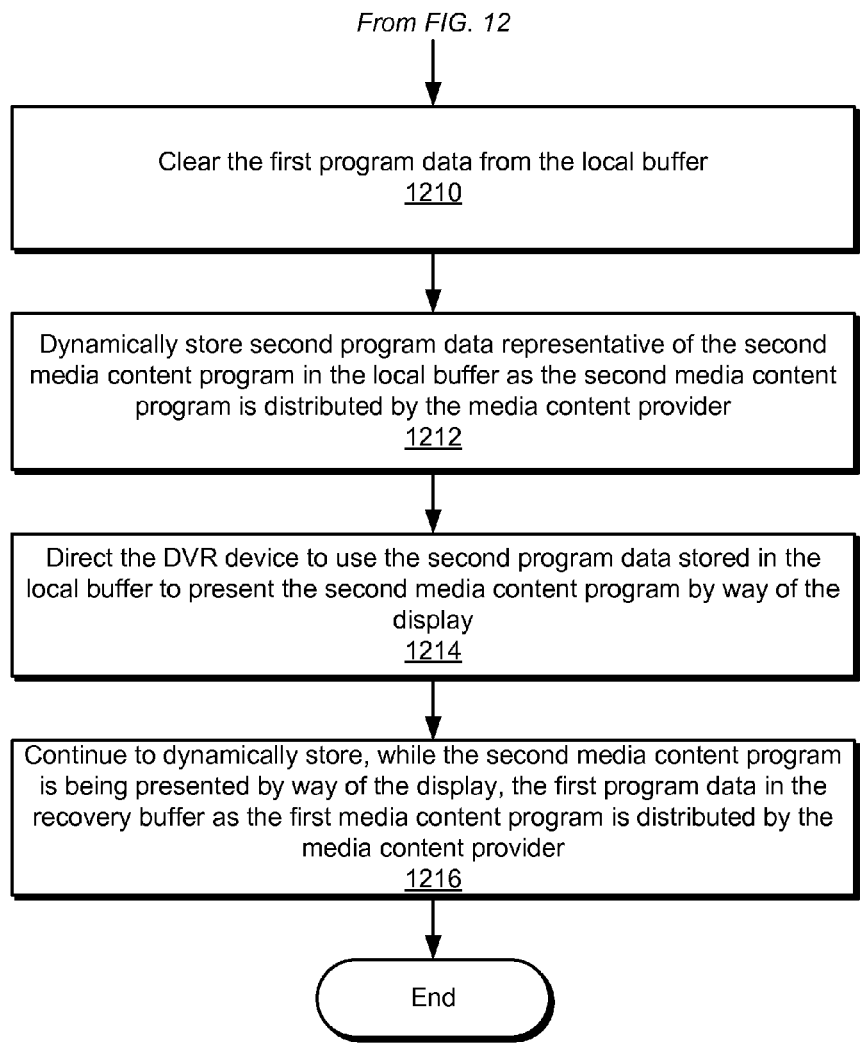

FIGS. 12-13 illustrate an exemplary method 1200 of recovering media content lost due to a channel change event. While FIGS. 12-13 illustrate exemplary steps according to one embodiment, other embodiments may omit, add to, reorder, and/or modify any of the steps shown in FIGS. 12-13. One or more of the steps shown in FIGS. 12-13 may be performed by media content recovery system 400 and/or any implementation thereof.

In step 1202, a media content recovery system detects that a DVR device is tuned to a first channel used by a media content provider to distribute a first media content program. Step 1202 may be performed in any of the ways described herein.

In step 1204, the media content recovery system dynamically stores, in response to the detecting, first program data representative of the first media content program in a local buffer residing on the DVR device and in a recovery buffer as the first media content program is distributed by the media content provider. Step 1204 may be performed in any of the ways described herein.

In step 1206, the media content recovery system directs the DVR device to use the first program data stored in the local buffer to present the first media content program by way of a display while the DVR device is tuned to the first channel. Step 1206 may be performed in any of the ways described herein.

In decision block 1208, the media content recovery system determines whether a first channel change event in which the DVR device switches from being tuned to the first channel to being tuned to a second channel used by the media content provider to distribute a second media content program is detected. If the channel change event is not detected, method 1200 returns to step 1204. If the channel change event is detected, method 1200 continues to step 1210, shown in FIG. 13.

In step 1210, the media content recovery system clears the first program data from the local buffer. Step 1210 may be performed in any of the ways described herein. Alternatively, in cases where the local buffer serves as the recovery buffer, the media content recovery system does not clear the first program data from the local buffer. Instead, the first program data continues to be stored in the local buffer as the first media content program is distributed. The local buffer playout pointer may be changed to point to the second channel information.

In step 1212, the media content recovery system dynamically stores second program data representative of the second media content program in the local buffer as the second media content program is distributed by the media content provider. Step 1212 may be performed in any of the ways described herein. Alternatively, in cases where the local buffer serves as the recovery buffer, the media content recovery system stores the second program data in a new local buffer.

In step 1214, the media content recovery system directs the DVR device to use the second program data stored in the local buffer to present the second media content program by way of the display. Step 1214 may be performed in any of the ways described herein. Alternatively, in cases where the local buffer serves as the recovery buffer, the media content recovery system uses the second program data stored in the new local buffer to present the second media content program by way of the display.

In step 1216, the media content recovery system continues to dynamically store, while the second media content program is being presented by way of the display, the first program data in the recovery buffer as the first media content program is distributed by the media content provider. Step 1216 may be performed in any of the ways described herein. Alternatively, in cases where the local buffer serves as the recovery buffer, the media content recovery system continues to dynamically store, while the second media content program is being presented by way of the display, the first program data in the local buffer as the first media content program is distributed by the media content provider.

Figure 14:
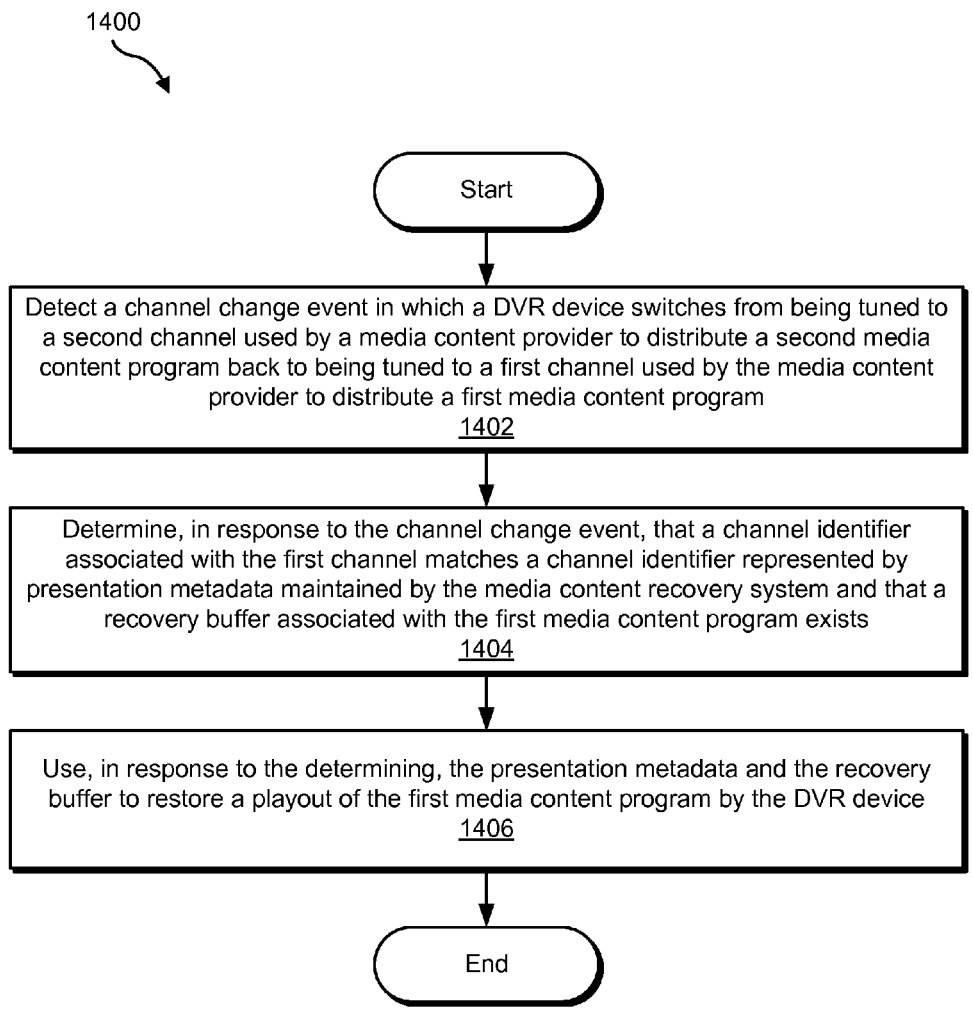

FIG. 14 illustrates an exemplary method 1400 of recovering media content lost due to a channel change event. While FIG. 14 illustrates exemplary steps according to one embodiment, other embodiments may omit, add to, reorder, and/or modify any of the steps shown in FIG. 14. One or more of the steps shown in FIG. 14 may be performed by media content recovery system 400 and/or any implementation thereof.

In step 1402, a media content recovery system detects a channel change event in which a DVR device switches from being tuned to a second channel used by a media content provider to distribute a second media content program back to being tuned to a first channel used by the media content provider to distribute a first media content program. Step 1402 may be performed in any of the ways described herein.

In step 1404, the media content recovery system determines, in response to the channel change event, that a channel identifier associated with the first channel matches a channel identifier represented by presentation metadata maintained by the media content recovery system and that a recovery buffer associated with the first media content program exists. Step 1404 may be performed in any of the ways described herein.

In step 1406, the media content recovery system uses, in response to the determining, the presentation metadata and the recovery buffer to restore a playout of the first media content program by the DVR device. Step 1406 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 15:
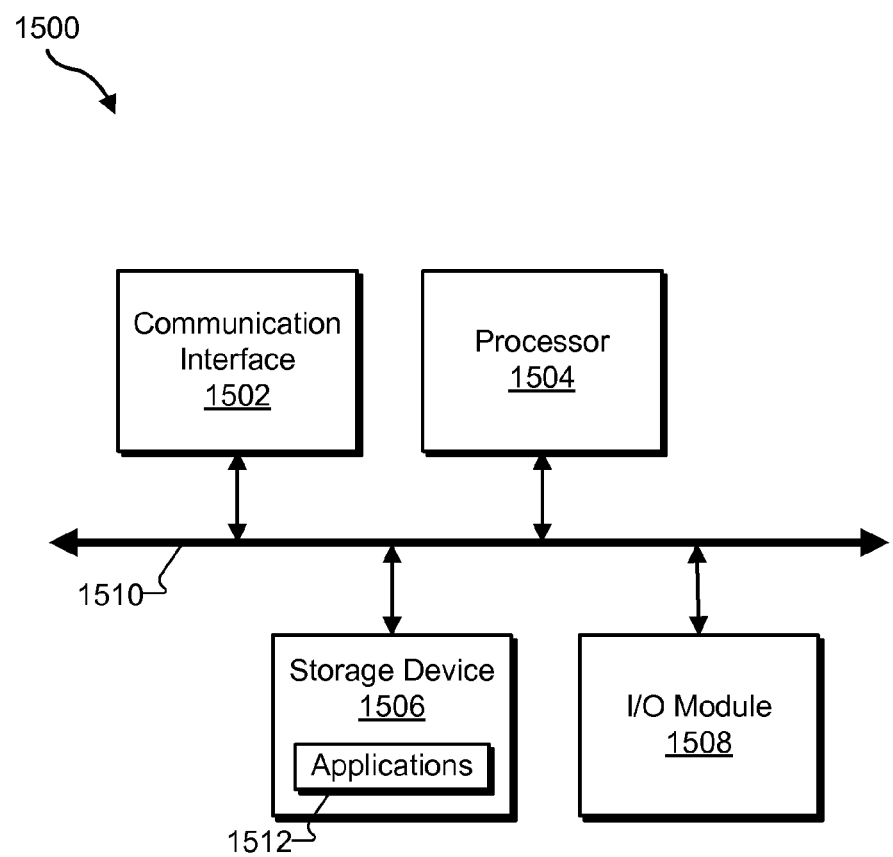
FIG. 15 illustrates an exemplary computing device according to principles described herein.

FIG. 15 illustrates an exemplary computing device 1500 that may be configured to perform one or more of the processes described herein. As shown in FIG. 15, computing device 1500 may include a communication interface 1502, a processor 1504, a storage device 1506, and an input/output ("I/O") module 1508 communicatively connected via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit capable of processing data or interpreting, executing, and/or directing execution of one or more of the instructions, processes, and/or operations described herein. Processor 1504 may direct execution of operations in accordance with one or more applications 1512 or other computer-executable instructions such as may be stored in storage device 1506 or another computer-readable medium.

Storage device 1506 may include one or more data storage media, devices, or configurations and may employ any type, form, and combination of data storage media and/or device. For example, storage device 1506 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1506. For example, data representative of one or more executable applications 1512 configured to direct processor 1504 to perform any of the operations described herein may be stored within storage device 1506. In some examples, data may be arranged in one or more databases residing within storage device 1506.

I/O module 1508 may be configured to receive user input and provide user output and may include any hardware, firmware, software, or combination thereof supportive of input and output capabilities. For example, I/O module 1508 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1508 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1500. For example, one or more applications 1512 residing within storage device 1506 may be configured to direct processor 1504 to perform one or more processes or functions associated with detection facility 402 and/or buffer management facility 404. Likewise, storage facility 406 may be implemented by or within storage device 1506.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by a media content recovery system, that a digital video recording ("DVR") device is tuned to a first channel used by a media content provider to distribute a first media content program;
    dynamically storing, by the media content recovery system in response to the detecting, first program data representative of the first media content program in a local buffer residing on the DVR device and in a recovery buffer as the first media content program is distributed by the media content provider;
    directing, by the media content recovery system, the DVR device to use the first program data stored in the local buffer to present the first media content program by way of a display while the DVR device is tuned to the first channel;
    detecting, by the media content recovery system, a first channel change event in which the DVR device switches from being tuned to the first channel to being tuned to a second channel used by the media content provider to distribute a second media content program; and
    in response to the first channel change event,
        clearing, by the media content recovery system, the first program data from the local buffer,
        dynamically storing, by the media content recovery system, second program data representative of the second media content program in the local buffer as the second media content program is distributed by the media content provider,
        directing, by the media content recovery system, the DVR device to use the second program data stored in the local buffer to present the second media content program by way of the display, and
        continuing to dynamically store, by the media content recovery system while the second media content program is being presented by way of the display, the first program data in the recovery buffer as the first media content program is distributed by the media content provider;
    wherein the method further comprises:
    maintaining, by the media content recovery system, presentation metadata associated with the presentation of the first media content program, the presentation metadata representative of a channel identifier associated with the first channel, a buffer depth of the local buffer at a time associated with the first channel change event, and a playout pointer position within the local buffer at the time associated with the first channel change event;
    detecting, by the media content recovery system, a second channel change event in which the DVR device switches from being tuned to the second channel back to being tuned to the first channel; and
    in response to the second channel change event,
        accessing, by the media content recovery system, the presentation metadata to identify a playout pointer position within the recovery buffer that matches the playout pointer position within the local buffer at the time associated with the first channel change event,
        directing, by the media content recovery system, the DVR device to use the first program data stored in the recovery buffer to resume the presentation of the first media content program by way of the display starting at the identified playout pointer position within the recovery buffer,
        clearing, by the media content recovery system, the second program data from the local buffer,
        dynamically storing, by the media content recovery system, third program data representative of the first media content program in the local buffer beginning at a time associated with the second channel change event as the first media content program is distributed by the media content provider,
        detecting, by the media content recovery system during the presentation of the first media content program, a playout depletion of the recovery buffer, and
        directing, by the media content recovery system in response to the playout depletion of the recovery buffer, the DVR device to switch to using the third program data stored in the local buffer to continue the presentation of the first media content program by way of the display.

2. The method of claim 1, wherein the recovery buffer resides on the DVR device.

3. The method of claim 1, wherein the DVR device is connected to a local area network, and wherein the recovery buffer resides on an additional DVR device connected to the local area network.

4. The method of claim 1, wherein the recovery buffer resides on at least one server remote from the DVR device.

5. The method of claim 1, embodied as computer-executable instructions on at least one non-transitory computer-readable medium.

6. A method comprising:
    detecting, by a media content recovery system, that a digital video recording ("DVR") device is tuned to a first channel used by a media content provider to distribute a first media content program;
    dynamically storing, by the media content recovery system in response to the detecting, first program data representative of the first media content program in a local buffer residing on the DVR device and in a recovery buffer as the first media content program is distributed by the media content provider;
    directing, by the media content recovery system, the DVR device to use the first program data stored in the local buffer to present the first media content program by way of a display while the DVR device is tuned to the first channel;
    detecting, by the media content recovery system, a first channel change event in which the DVR device switches from being tuned to the first channel to being tuned to a second channel used by the media content provider to distribute a second media content program; and in response to the first channel change event,
  clearing, by the media content recovery system, the first program data from the local buffer,
  dynamically storing, by the media content recovery system, second program data representative of the second media content program in the local buffer as the second media content program is distributed by the media content provider,
  directing, by the media content recovery system, the DVR device to use the second program data stored in the local buffer to present the second media content program by way of the display, and
  continuing to dynamically store, by the media content recovery system while the second media content program is being presented by way of the display, the first program data in the recovery buffer as the first media content program is distributed by the media content provider;
wherein the method further comprises:
maintaining, by the media content recovery system, presentation metadata associated with the presentation of the first media content program, the presentation metadata representative of a channel identifier associated with the first channel, a buffer depth of the local buffer at a time associated with the first channel change event, and a playout pointer position within the local buffer at the time associated with the first channel change event;
detecting, by the media content recovery system, a second channel change event in which the DVR device switches from being tuned to the second channel back to being tuned to the first channel; and
in response to the second channel change event,
  accessing, by the media content recovery system, the presentation metadata to identify a playout pointer position within the recovery buffer that matches the playout pointer position within the local buffer at the time associated with the first channel change event,
  directing, by the media content recovery system, the DVR device to use the first program data stored in the recovery buffer to resume the presentation of the first media content program by way of the display starting at the identified playout pointer position within the recovery buffer,
  restoring, by the media content recovery system while the DVR device uses the first program data stored in the recovery buffer to present the first media content program by way of the display, the first program data included in the recovery buffer to the local buffer, and
  directing, by the media content recovery system in response to the first program data being completely restored to the local buffer, the DVR device to use the first program data stored in the local buffer instead of the first program data stored in the recovery buffer to present the first media content program by way of the display.

7. The method of claim 6, wherein the restoring of the first program data from the recovery buffer to the local buffer comprises:
accessing the presentation metadata to identify the buffer depth of the local buffer at the time associated with the first channel change event; and
transferring an amount of first program data included in the recovery buffer and that matches the buffer depth to the local buffer.

8. The method of claim 6, further comprising:
determining, by the media content recovery system in response to the second channel change event, that a channel identifier associated with the first channel matches the channel identifier represented by the presentation metadata;
wherein the accessing of the presentation metadata to identify the playout pointer position within the recovery buffer and the directing of the DVR device to use the first program data stored in the recovery buffer to resume the presentation of the first media content program are performed in response to the determining that the channel identifier associated with the first channel matches the channel identifier represented by the presentation metadata.

9. The method of claim 6, wherein the continuing to dynamically store the first program data in the recovery buffer is performed for a predetermined amount of time subsequent to the first channel change event, and wherein the method further comprises clearing the first program data from the recovery buffer in response to an elapsing of the predetermined amount of time if the DVR device does not tune back to the first channel during the predetermined amount of time.

10. The method of claim 6, wherein the continuing to dynamically store the first program data in the recovery buffer is performed while a predetermined number of additional channel change events occur subsequent to the first channel change event, and wherein the method further comprises clearing the first program data from the recovery buffer if the predetermined number of additional channel change events does not include a channel change event in which the DVR device switches back to being tuned to the first channel.

11. The method of claim 6, wherein the DVR device is tuned to the first channel using a first tuner, and wherein the dynamic storing of the first program data in the recovery buffer comprises copying the first program data stored in the local buffer into the recovery buffer.

12. The method of claim 6, wherein the DVR device is tuned to the first channel using a first tuner, and wherein the dynamic storing of the first program data in the recovery buffer comprises using a second tuner to concurrently tune to the first channel to acquire the first program data from the media content provider for storage in the recovery buffer.

13. The method of claim 6, wherein the recovery buffer resides on the DVR device.

14. The method of claim 6, wherein the DVR device is connected to a local area network, and wherein the recovery buffer resides on an additional DVR device connected to the local area network.

15. The method of claim 6, wherein the recovery buffer resides on at least one server remote from the DVR device.

16. The method of claim 15, wherein the at least one server is associated with the media content provider.

17. The method of claim 6, wherein the detecting of the first channel change event comprises detecting a channel change command provided by a user of the DVR device.

18. The method of claim 6, embodied as computer-executable instructions on at least one non-transitory computer-readable medium.

19. A system comprising:
a detection facility that detects that a digital video recording ("DVR") device is tuned to a first channel used by a media content provider to distribute a first media content program; and
a buffer management facility communicatively coupled to the detection facility and that
  dynamically stores, in response to the detection, first program data representative of the first media content program in a local buffer residing on the DVR device and in a recovery buffer separate from the local buffer as the first media content program is distributed by the media content provider, and directs the DVR device to use the first program data stored in the local buffer to present the first media content program by way of a display while the DVR device is tuned to the first channel;

wherein the detection facility detects a first channel change event in which the DVR device switches from being tuned to the first channel to being tuned to a second channel used by the media content provider to distribute a second media content program; and wherein, in response to the first channel change event, the buffer management facility clears the first program data from the local buffer, dynamically stores second program data representative of the second media content program in the local buffer as the second media content program is distributed by the media content provider, directs the DVR device to use the second program data stored in the local buffer to present the second media content program by way of the display, and continues to dynamically store, while the second media content program is being presented by way of the display, the first program data in the recovery buffer as the first media content program is distributed by the media content provider;

wherein the buffer management facility maintains presentation metadata associated with the presentation of the first media content program, the presentation metadata representative of a channel identifier associated with the first channel, a buffer depth of the local buffer at a time associated with the first channel change event, and a playout pointer position within the local buffer at the time associated with the first channel change event;

wherein the detection facility detects a second channel change event in which the DVR device switches from being tuned to the second channel back to being tuned to the first channel; and wherein, in response to the second channel change event, the buffer management facility accesses the presentation metadata to identify a playout pointer position within the recovery buffer that matches the playout pointer position within the local buffer at the time associated with the first channel change event, directs the DVR device to use the first program data stored in the recovery buffer to resume the presentation of the first media content program by way of the display starting at the identified playout pointer position within the recovery buffer, clears the second program data from the local buffer, dynamically stores third program data representative of the first media content program in the local buffer beginning at a time associated with the second channel change event as the first media content program is distributed by the media content provider, detects, during the presentation of the first media content program, a playout depletion of the recovery buffer, and directs, in response to the playout depletion of the recovery buffer, the DVR device to switch to using the third program data stored in the local buffer to continue the presentation of the first media content program by way of the display.

20. A system comprising:

a detection facility that detects that a digital video recording ("DVR") device is tuned to a first channel used by a media content provider to distribute a first media content program; and a buffer management facility communicatively coupled to the detection facility and that dynamically stores, in response to the detection, first program data representative of the first media content program in a local buffer residing on the DVR device and in a recovery buffer separate from the local buffer as the first media content program is distributed by the media content provider, and directs the DVR device to use the first program data stored in the local buffer to present the first media content program by way of a display while the DVR device is tuned to the first channel;

wherein the detection facility detects a first channel change event in which the DVR device switches from being tuned to the first channel to being tuned to a second channel used by the media content provider to distribute a second media content program; and wherein, in response to the first channel change event, the buffer management facility clears the first program data from the local buffer, dynamically stores second program data representative of the second media content program in the local buffer as the second media content program is distributed by the media content provider, directs the DVR device to use the second program data stored in the local buffer to present the second media content program by way of the display, and continues to dynamically store, while the second media content program is being presented by way of the display, the first program data in the recovery buffer as the first media content program is distributed by the media content provider;

wherein the buffer management facility maintains presentation metadata associated with the presentation of the first media content program, the presentation metadata representative of a channel identifier associated with the first channel, a buffer depth of the local buffer at a time associated with the first channel change event, and a playout pointer position within the local buffer at the time associated with the first channel change event;

wherein the detection facility detects a second channel change event in which the DVR device switches from being tuned to the second channel back to being tuned to the first channel; and wherein, in response to the second channel change event, the buffer management facility accesses the presentation metadata to identify a playout pointer position within the recovery buffer that matches the playout pointer position within the local buffer at the time associated with the first channel change event, directs the DVR device to use the first program data stored in the recovery buffer to resume the presentation of the first media content program by way of the display starting at the identified playout pointer position within the recovery buffer, restores, while the DVR device uses the first program data stored in the recovery buffer to present the first media content program by way of the display, the first program data included in the recovery buffer to the local buffer, and directs, in response to the first program data being completely restored to the local buffer, the DVR device to use the first program data stored in the local buffer instead of the first program data stored in the recovery buffer to present the first media content program by way of the display.

\* \* \* \* \*